United States Patent
Nakazawa et al.

(10) Patent No.: US 9,067,430 B2
(45) Date of Patent: Jun. 30, 2015

(54) INK JET RECORDING APPARATUS AND RECORDING METHOD

(75) Inventors: Koichiro Nakazawa, Machida (JP); Hideaki Takamiya, Yokohama (JP); Kanako Soma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 13/406,362

(22) Filed: Feb. 27, 2012

(65) Prior Publication Data

US 2012/0243005 A1    Sep. 27, 2012

(30) Foreign Application Priority Data

Mar. 1, 2011   (JP) ................. 2011-044071

(51) Int. Cl.
| | |
|---|---|
| B41J 2/21 | (2006.01) |
| B41J 11/00 | (2006.01) |
| B41J 15/04 | (2006.01) |
| G06K 15/10 | (2006.01) |
| G06K 15/02 | (2006.01) |

(52) U.S. Cl.
CPC ............. B41J 2/2146 (2013.01); B41J 11/008 (2013.01); B41J 15/04 (2013.01); G06K 15/102 (2013.01); G06K 15/1868 (2013.01)

(58) Field of Classification Search
USPC ................................. 358/471, 1.15
See application file for complete search history.

(56) References Cited

U.S. PATENT DOCUMENTS

| | | | | |
|---|---|---|---|---|
| 6,417,931 | B2 * | 7/2002 | Mori et al. ................ | 358/1.15 |
| 6,456,732 | B1 * | 9/2002 | Kimbell et al. ............ | 382/112 |
| 6,560,376 | B2 * | 5/2003 | Kimbell et al. ............ | 382/296 |
| 7,106,477 | B2 * | 9/2006 | Horobin .................... | 358/1.9 |
| 8,477,362 | B2 * | 7/2013 | Fujita ........................ | 358/1.2 |
| 2001/0043359 | A1 * | 11/2001 | Mori et al. ................ | 358/1.15 |
| 2011/0176172 | A1 * | 7/2011 | Nakata ...................... | 358/1.15 |
| 2011/0235064 | A1 * | 9/2011 | Arai .......................... | 358/1.2 |
| 2011/0267396 | A1 * | 11/2011 | Yamamoto et al. ....... | 347/16 |
| 2012/0188562 | A1 * | 7/2012 | Marumoto et al. ........ | 358/1.2 |

FOREIGN PATENT DOCUMENTS

| | | | | |
|---|---|---|---|---|
| JP | 5-142914 | A | 6/1993 | |
| JP | 410058787 | | * 3/1998 | ............ B41J 21/00 |

* cited by examiner

*Primary Examiner* — Jerome Grant, II
(74) *Attorney, Agent, or Firm* — Canon USA Inc IP Division

(57) ABSTRACT

A recording apparatus includes a processing unit configured to convert acquired image information into dot data, and an image forming unit configured to form an image on a recording medium based on the image information converted into dot data by the processing unit, wherein the processing unit enlarges an image of the acquired image information to a size protruding into margins formed at both side ends of the recording medium, then converts the image information into dot data, and then, based on side end position information of the recording medium detected by the detection unit, processes the image information converted into dot data so that image formation is not performed on portions of the enlarged image protruding into the margins.

22 Claims, 14 Drawing Sheets

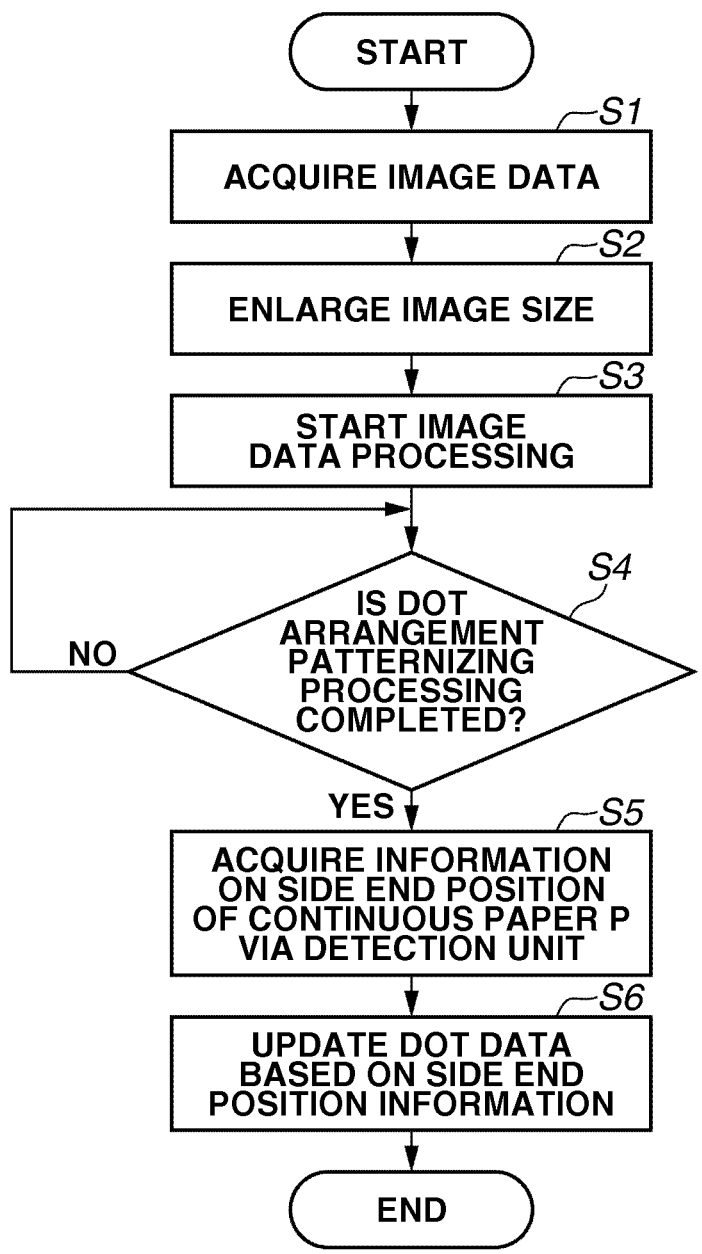

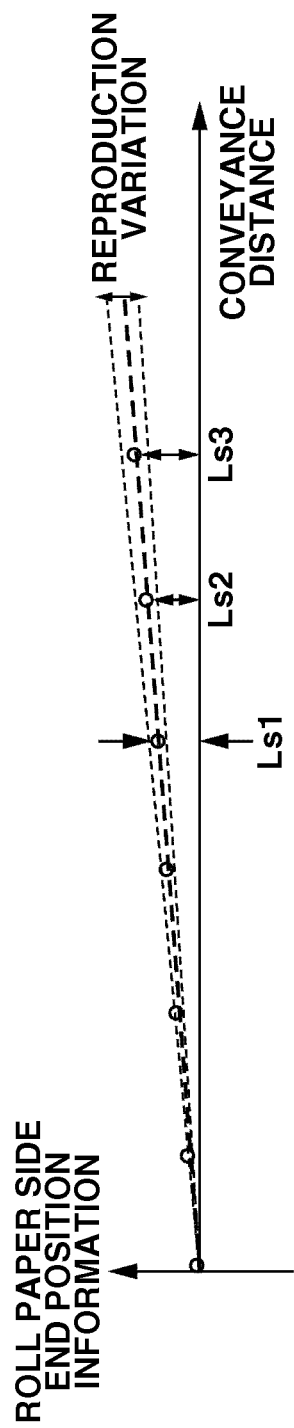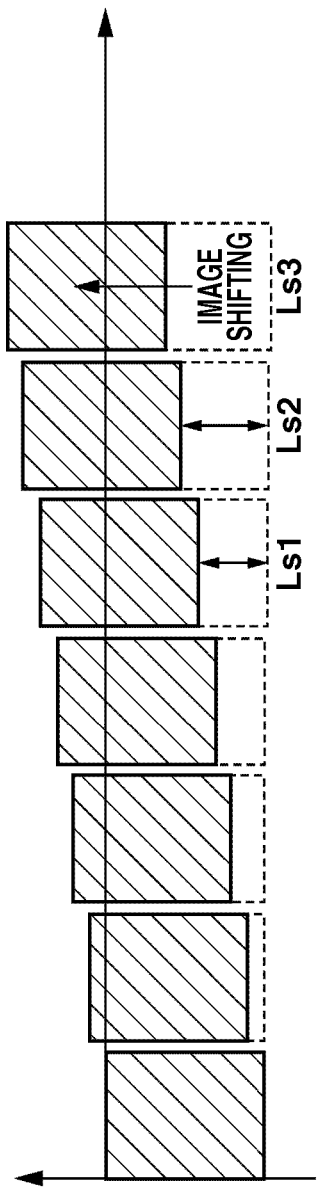

INK JET RECORDING APPARATUS AND RECORDING METHOD

BACKGROUND OF THE INVENTION

1. Field of the Invention

The present invention relates to a recording apparatus and a recording method for recording an image on a recording medium.

2. Description of the Related Art

When an image is to be recorded on continuous paper, which is pulled out from roll paper (rolled continuous paper), with a full-line type ink jet recording apparatus, it is ideal that the conveyance direction of the continuous paper is perpendicular to the longitudinal direction of a recording head. However, the conveyance direction of the continuous paper may not constantly be perpendicular to the longitudinal direction of the recording head, so that the continuous paper may possibly skew. If the continuous paper skews, the position of an image to be recorded thereon shifts with respect to the continuous paper, and the image cannot be recorded at an exact position thereon. For example, when an L-size (89×127 mm) image is to be recorded as a bordered photograph with 4-mm margins on continuous paper, there may be a case where a margin width at one side end is 2 mm and a margin width at the other side end is 6 mm in the continuous paper conveyance direction. When the continuous paper is trimmed into the L size in this state, uneven margin widths at both ends and at the top and bottom may arise and an undesirable photograph may be produced.

Japanese Patent Application Laid-Open No. 5-142914 discusses a technique for preventing color misregistration by detecting a side end position of a recording sheet with a detection unit and, based on the detected side end position information, shifting an image according to a skew state of the recording sheet. While Japanese Patent Application Laid-Open No. 5-142914 discusses an image recording apparatus for repetitively overlaying images of a plurality of colors onto the same recording region on the recording paper for each color to form a color image, this configuration can be achieved with continuous paper conveyance in a full-line type ink jet recording apparatus. Specifically, the adjustment of margin positions can be attained by detecting a side end position of the continuous paper with a detection unit provided at a side end of the conveyance path and shifting the position of an image according to the skew state of the continuous paper based on the detected information.

However, full-line type ink jet recording apparatuses perform various corrections in addition to continuous paper skew correction. For example, a full-line type ink jet recording apparatus performs head shading correction to correct a variation in amount of discharge by discharge nozzles. A full-line type ink jet recording apparatus having full-line type ink jet recording heads with a plurality of nozzle chips performs inter-chip registration adjustment correction and non-discharge complementary correction for complementing non-discharge nozzles. Basically, the full-line type ink jet recording apparatus performs these corrections on a nozzle basis. Therefore, when skew correction is performed with the image shifting discussed in Japanese Patent Application Laid-Open No. 5-142914, it is necessary to take into consideration interactions with such a plurality of corrections. Generally in head shading correction, the image density is adjusted to a dense level for nozzles having a small amount of discharge and to a light level for nozzles having a large amount of discharge. Therefore, since the processing of shifting an image affects head shading correction, the image shift processing needs to be performed prior to the head shading correction processing. Further, in registration adjustment correction, in a case where adjacent nozzle chips are overlapped, it is common to perform processing for smoothly connecting between nozzle chips by gradually changing the number of nozzle chips used in an overlapped region. Therefore, the image shift processing also needs to be performed prior to the registration adjustment correction processing. This also applies to the non-discharge complementary correction processing. Specifically, shifting an image after determining the non-discharge nozzle processing will result in incomplete non-discharge nozzle processing. Therefore, the image shift processing needs to be performed prior to the non-discharge complementary correction processing. This means that the image shift processing needs to be performed prior to various processing operations.

In image shift processing, the detection unit provided at a side end of the conveyance path detects a side end position of the continuous paper to determine the amount of image shifting. This processing needs to be made prior to various image processing operations including the head shading correction processing, the inter-chip registration adjustment correction, and the binarization processing for determining discharge and non-discharge including correction processing such as non-discharge complementary correction. Thus, a plurality of pieces of processing needs to be performed between a timing of detecting a side end position of the continuous paper and a timing of recording. Therefore, if the plurality of pieces of processing is performed after the image shift processing, skew correction control may not in time.

SUMMARY OF THE INVENTION

The present invention is directed to a recording apparatus and a recording method for recording an image at a suitable position even when a skew of continuous paper occurs.

According to an aspect of the present invention, an image forming apparatus includes a conveyance unit configured to convey a recording medium, a processing unit configured to generate dot data for forming an image based on image information, an image forming unit configured to form an image on the recording medium conveyed by the conveyance unit based on the dot data generated by the processing unit, and a detection unit configured to detect a side end of the recording medium conveyed by the conveyance unit, wherein the processing unit enlarges an image of the acquired image information to a size protruding into margins formed at both side ends of the recording medium, then converts the image information into dot data, and then, based on a result of detection by the detection unit, processes the dot data so that image formation is not performed on portions of the enlarged image protruding into the margins.

According to exemplary embodiments of the present invention, it is possible to provide a recording apparatus and a recording method for recording an image at a suitable position even when a skew of a recording medium occurs.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a flowchart illustrating a recording operation of the ink jet recording apparatus according to the first exemplary embodiment.

FIGS. 10A and 10B illustrate a relationship between continuous paper skew information and image shift processing.

DESCRIPTION OF THE EMBODIMENTS

Various exemplary embodiments, features, and aspects of the invention will be described in detail below with reference to the drawings.

Figure 1:
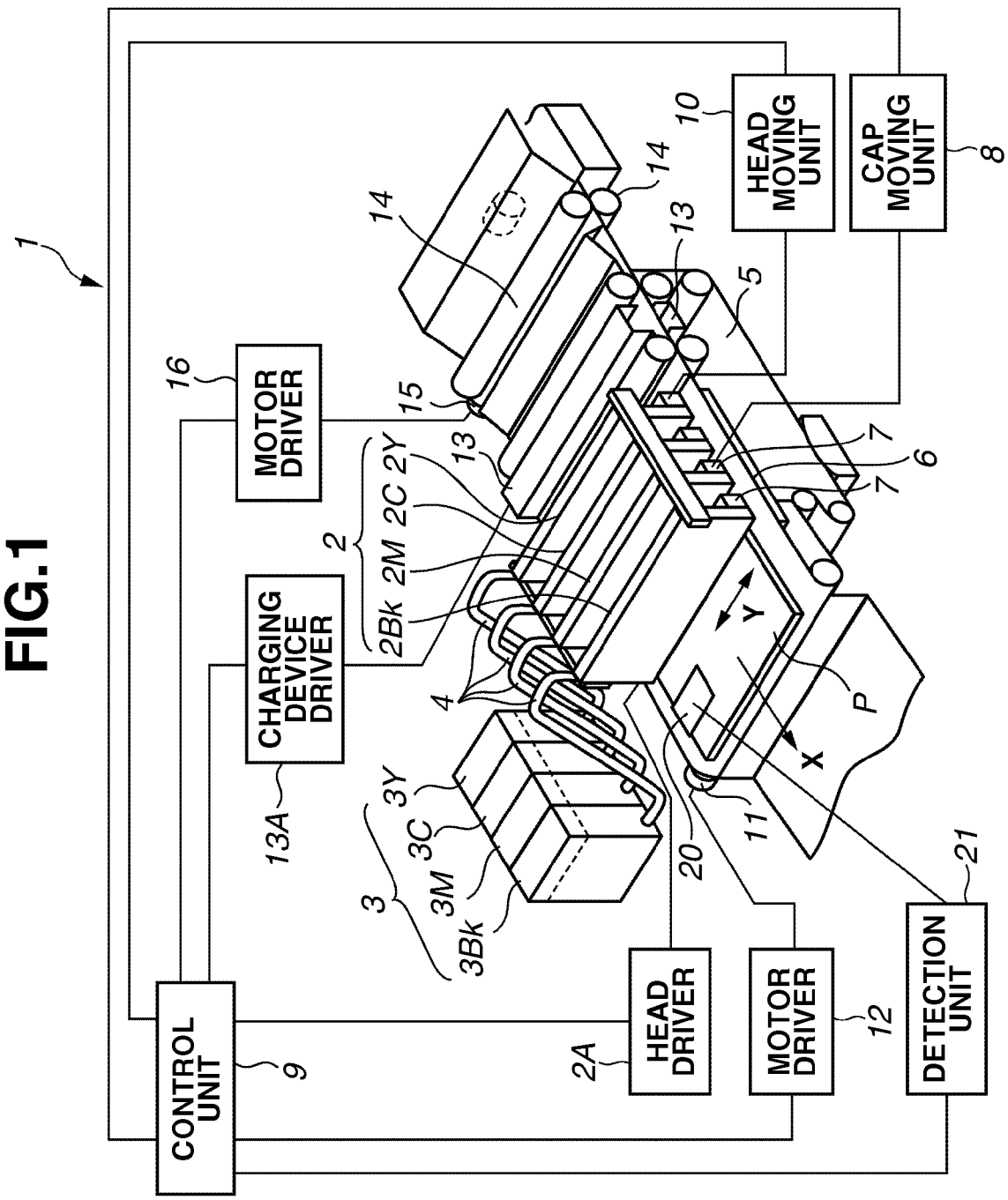
FIG. 1 schematically illustrates a configuration of an ink jet recording apparatus according to a first exemplary embodiment of the present invention.
Figure 2:
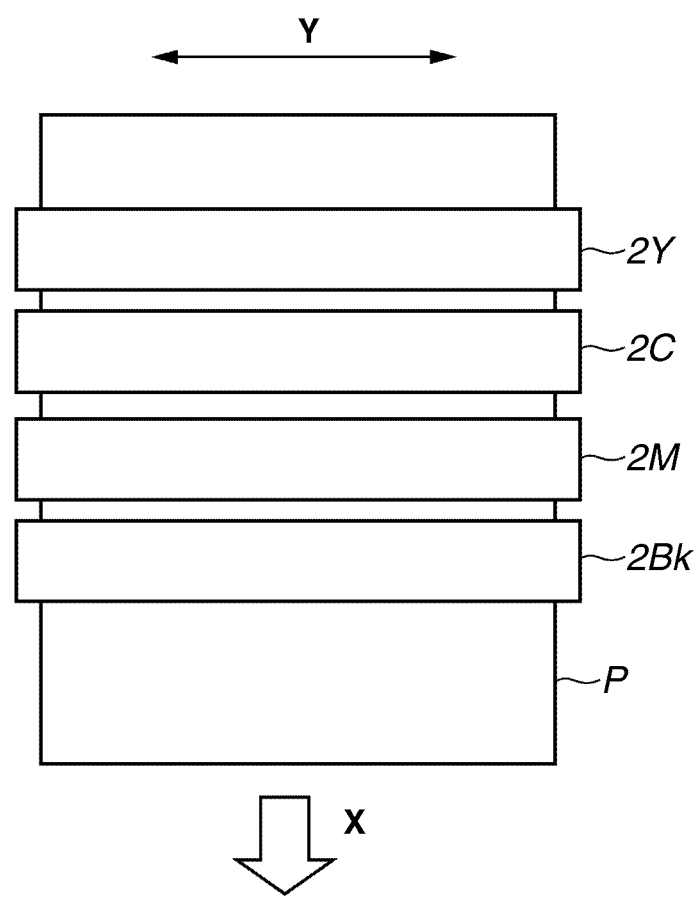
FIG. 2 is a plan view schematically illustrating an arrangement of recording heads used by the ink jet recording apparatus according to the first exemplary embodiment of the present invention.

FIG. 1 schematically illustrates a configuration of an ink jet recording apparatus according to a first exemplary embodiment of the present invention. FIG. 2 is a plan view schematically illustrating an arrangement of recording heads of the ink jet recording apparatus. An ink jet recording apparatus 1 according to the present exemplary embodiment forms an image on continuous paper pulled out from roll paper (rolled continuous paper).

Figure 4A:
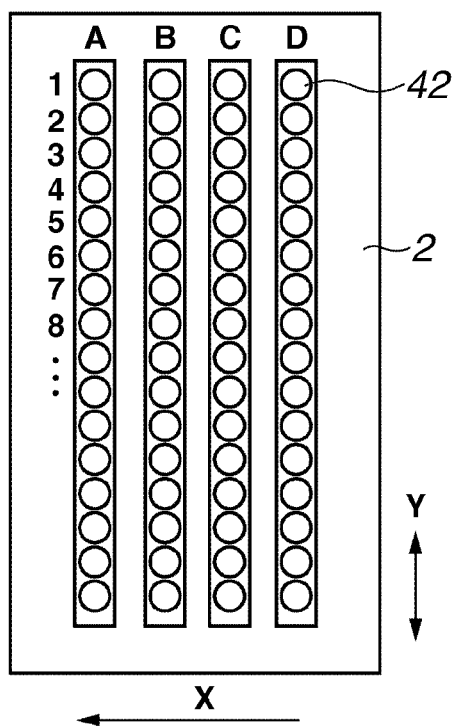
FIG. 4A illustrates a nozzle configuration in a recording head corresponding to one ink color illustrated in FIGS. 1 and 2.

Long recording heads 2Y, 2M, 2C, and 2Bk, which are longer than the width of the continuous paper (a continuous recording medium or a recording medium), extend in a direction perpendicular to the conveyance direction of continuous paper (hereinafter referred to as main scanning direction). The recording heads 2Y, 2M, 2C, and 2Bk are full-line type ink jet recording heads arranged in parallel with each other. The ink jet recording apparatus 1 according to the present exemplary embodiment employs recording heads +10 mm longer than the width of continuous paper. However, the length of the recording heads can be suitably determined. The recording heads 2Y, 2M, 2C, and 2Bk discharge yellow ink, magenta ink, cyan ink, and black ink, respectively. These four recording heads have approximately the same configuration. In the following descriptions, unless distinction is needed, the recording heads will be collectively referred to as recording heads 2. Each of the recording heads 2 for respective colors includes four nozzle arrays as illustrated in FIG. 4A. The recording heads 2 are respectively connected to ink tanks 3Y, 3M, 3C, and 3Bk (hereinafter collectively referred to as ink tanks 3) storing yellow ink, magenta ink, cyan ink, and black ink, respectively, through connection pipes 4. These ink tanks 3 are removable from respective connection pipes 4.

For recovery processing, the recording heads 2 can be moved up and down in a direction facing a platen 6 by a head moving unit 10 controlled by a control unit 9. The recording heads 2 face the platen 6 so that an endless conveyance belt 5 is sandwiched by the recording heads 2 and the platen 6. The recording heads 2Y, 2M, 2C, and 2Bk for respective colors are arranged at predetermined intervals along the conveyance direction of the conveyance belt 5. Each recording head 2 is provided with ink discharge ports (nozzles) for discharging ink, a common fluid chamber for temporarily storing ink from the corresponding ink tank 3, and an ink flow path for leading ink from the common fluid chamber to the ink discharge ports. In each ink flow path, an electrothermal transducer (heater) is provided for a corresponding discharge port as a discharge energy generation element for generating thermal energy for discharging supplied ink. Each heater is driven by a head driver 2A, which is electrically connected to the control unit 9. The drive of the heater is controlled in response to an ON/OFF signal (discharge/non-discharge signal) transmitted from the control unit 9.

A head cap 7 is provided on one side of the recording head 2 to enable discharging from its discharge port thickened ink possibly existing in the ink flow path of the recording head 2, thus performing recovery processing of the recording head 2. The head cap 7 is shifted by a half pitch with respect to the interval of recording head arrangements, and moved directly under the recording head 2 by a cap moving unit 8 controlled by the control unit 9. Thus, the head cap 7 can receive waste ink discharged from the ink discharge port.

The conveyance belt 5 for conveying continuous paper P is applied to a drive roller connected to a belt driving motor 11. The operation of the conveyance belt 5 is changed by a motor driver 12 connected to the control unit 9. A charging device 13 is provided on the upstream side of the conveyance belt 5 to charge the conveyance belt 5 to enable close contact between the continuous paper P and the conveyance belt 5. The charging device 13 is turned ON and OFF by a charging device driver 13a connected to the control unit 9. A feeding roller pair 14 supplies the continuous paper P onto the conveyance belt 5. A motor 15 for rotating the feeding roller pair 14 is connected thereto. The operation of the motor 15 is changed by a motor driver 16 connected to the control unit 9.

Figure 6:
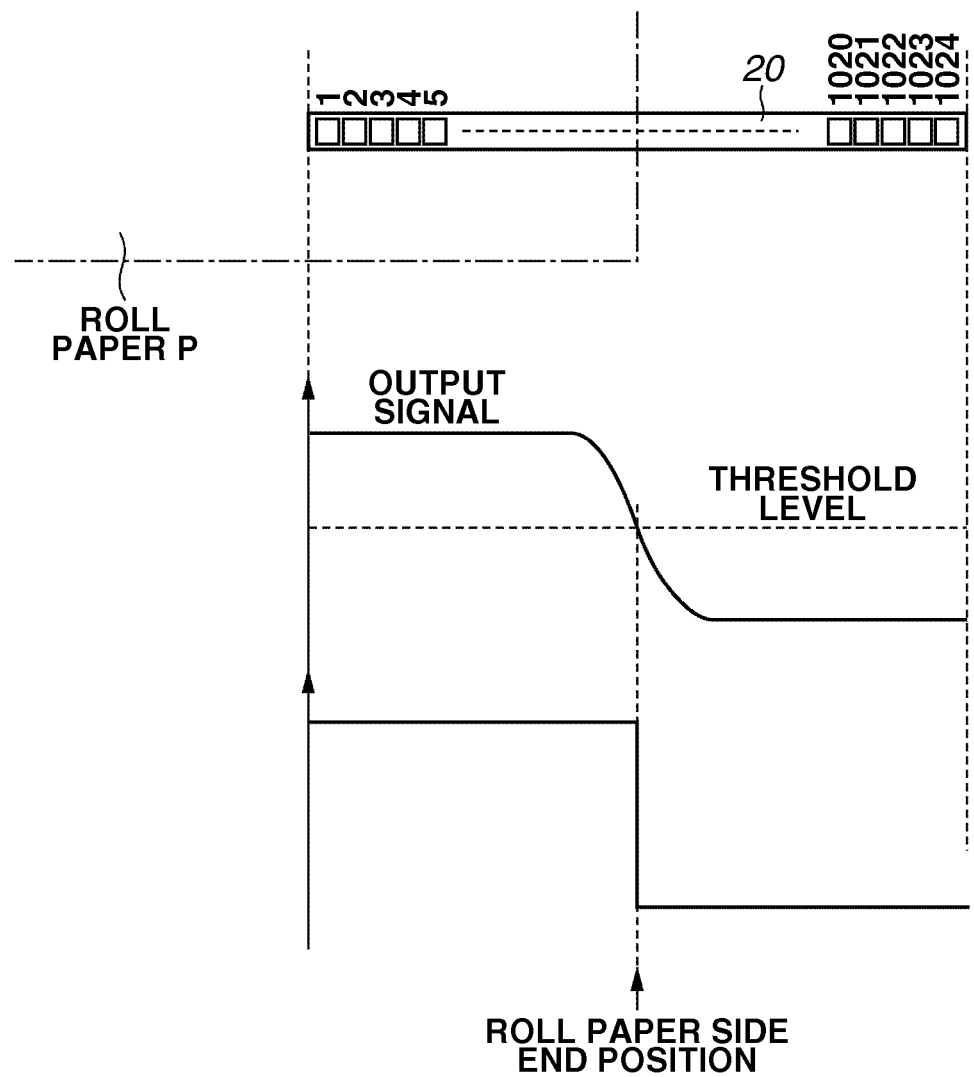
FIG. 6 illustrates an output signal corresponding to a positional relationship between continuous paper and a detection sensor, and a relevant signal.

A detection unit 21 (for detecting a side end position of the continuous paper P) periodically detects a variation in side end position of the continuous paper P by using a detection sensor 20 provided at a side end of the conveyance path. The detection sensor 20 may be a charge-coupled device (CCD) sensor. In the present exemplary embodiment, as illustrated in FIG. 6, a light-sensitive element formed of 1024 pixels for one row is provided. The light-sensitive element outputs an analog signal indicating the amount of reflected light at a side end region of the continuous paper P. A side end position of the continuous paper P can be determined by binarization based on a predetermined threshold level. Although the interval of pixels of the light-sensitive element is adjusted to be equivalent to 1200 dpi, the interval is not limited thereto. The interval of the pixels can be suitably determined by performing interpolation processing to enable calculating a side end position of the continuous paper P. Although, in the present exemplary embodiment, the detection sensor 20 is provided only at one side end of the continuous paper P, the detection sensor 20 can be provided on both side ends.

When performing a recording operation on the continuous paper P with the above-described apparatus, the recording head 2 raises to separate from the platen 6 and then the head cap 7 moves directly under the recording head 2, thus performing recovery processing. Then, the head cap 7 moves to a standby position. Then, the recording head 2 moves on the platen side up to the recording position. Then, the control unit 9 drives the charging device 13, the conveyance belt 5, and the feeding roller pair 14 to convey the continuous paper P onto the conveyance belt 5. Based on image data trimmed based on information from the detection unit 21 for detecting a side end position of the continuous paper P, the recording head 2 discharges ink onto the continuous paper P to record a color image thereon.

Ink jet recording methods to which the present invention is applicable are not limited to the heater-based ink jet method as illustrated in FIGS. 1 and 2. For example, a charge control method and an emission control method are applicable to a continuous type method for continuously emitting a jet of ink drops. Further, a pressure control method for discharging ink by mechanical vibration of a piezoelectric vibration element is applicable to an on-demand type method for discharging ink drops as required.

Figure 3:
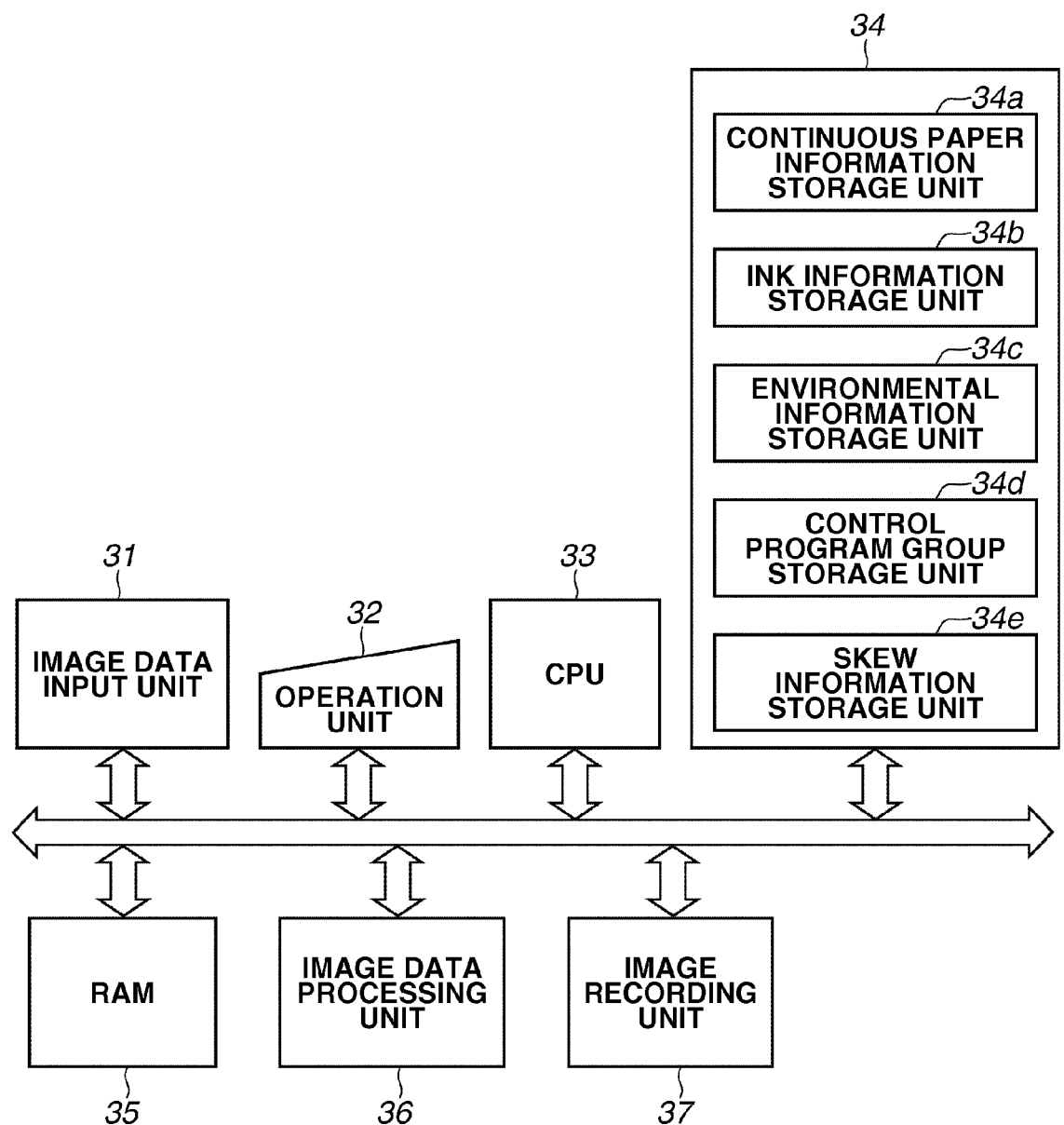
FIG. 3 is a block diagram illustrating a configuration of a control system of the inkjet recording apparatus according to the first exemplary embodiment of the present invention.

FIG. 3 is a block diagram illustrating a configuration of a control system of the ink jet recording apparatus 1. Referring to FIG. 3, an image data input unit 31 inputs multivalued image data from an image input apparatus, such as a digital camera, and multivalued image data (image information) stored in a hard disk of a personal computer. An operation unit 32 is provided with various keys for setting various parameters and instructing the start of recording. A central processing unit (CPU) 33 controls the entire recording apparatus 1 according to various programs stored in a storage medium. A storage unit 34 stores various data. The storage unit 34 includes a continuous paper information storage unit 34a for storing information about the continuous paper type, an ink information storage unit 34b for storing information about ink, and an environmental information storage unit 34c for storing environmental information, such as temperature and humidity, at the time of recording. The storage unit 34 further includes a control program group storage unit 34d for storing various programs and a skew information storage unit 34e for storing continuous paper skew information and threshold value information for the image shift processing. A random access memory (RAM) 35 is used as a work area for various programs in the storage unit 34, a temporary area for error processing, and a work area for image processing. The ink jet recording apparatus 1 according to the present exemplary embodiment operates according to these programs. The storage unit 34 for storing these programs may be a read-only memory (ROM), a floppy disk (FD), a compact disc ROM (CD-ROM), a hard disk (HD), a memory card, a magnetic optical disk, and so on. The control unit 9 may copy various tables in the storage unit 34 to the RAM 35, change the contents of each table, and perform image processing referring to these changed tables.

An image data processing unit 36 processes image data. Specifically, the image data processing unit 36 adjusts the size of an input image, and then quantizes the input multivalued image data into N-valued image data for each pixel to generate binary data patterns (dot patterns) corresponding to a gradation level "K" indicated by each of quantized pixels. The K-valued processing method for the input multivalued image data is not limited to an error diffusion method, and may be any halftone processing method such as a mean density preservation method and a dither matrix method. Based on information about a detected side end position of the continuous paper P, the image data processing unit 36 performs trimming processing for the dot patterns. An image recording unit 37 discharges ink based on the dot patterns generated by the image data processing unit 36 to form a dot image on the continuous paper P. The image recording unit 37 includes a mechanism illustrated in FIGS. 1 and 2. A bus line 38 transmits address signals, data, control signals, etc., in the ink jet recording apparatus 1.

Figure 4B:
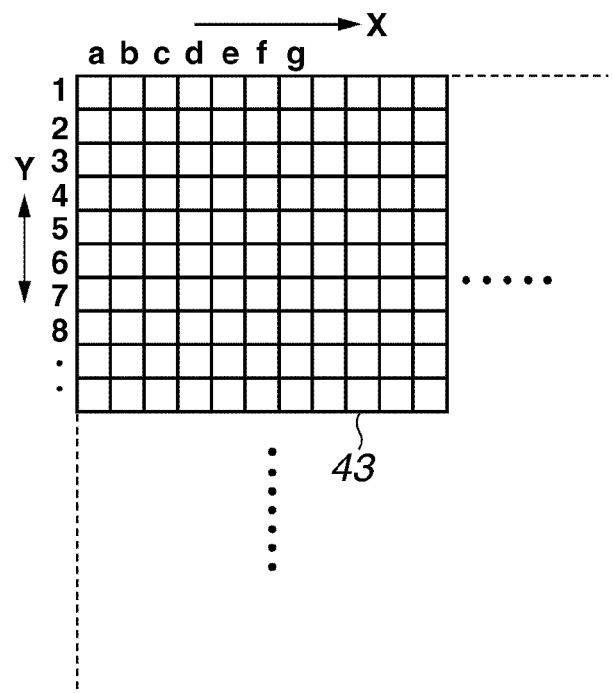
FIG. 4B illustrates pixel area arrangements corresponding to the nozzle configuration.

FIG. 4A illustrates a nozzle configuration of the recording head 2 corresponding to one ink color (recording color) illustrated in FIGS. 1 and 2. FIG. 4B illustrates pixel area arrangements corresponding to the nozzle configuration.

As illustrated in FIG. 4A, the recording head 2 corresponding to one ink color is provided with four nozzle arrays 42 (nozzle arrays A to D). Each nozzle array 42 includes 960 nozzles each discharging an ink amount of 2.8 picoliter (pl) arranged approximately in one row at intervals equivalent to 1200 dots per inch (dpi) (at intervals of approximately 21.2 µm). Referring to FIG. 4A, the continuous paper P advances in the continuous paper conveyance direction X (main scanning direction) and the nozzles are arranged in the nozzle arrangement direction Y, which is perpendicular to the continuous paper conveyance direction X.

Based on record data, the full-line type ink jet recording apparatus 1 according to the present exemplary embodiment discharges ink from the four nozzle arrays 42 (nozzle arrays A, B, C, and D) of the recording head 2 for one ink color onto the continuous paper P conveyed in the continuous paper conveyance direction X. As illustrated in FIG. 4B, pixel areas assumed for the continuous paper P subjected to ink discharge from the nozzles and ink placement are arranged with a resolution of 1200 dpi both in the continuous paper conveyance direction X and the nozzle arrangement direction Y. A matrix 43 of pixel areas is formed with this resolution. The ink jet recording apparatus 1 generates binary data (dot data) indicating whether ink is to be discharged or not for respective pixel areas in the matrix 43. Rows of the pixel areas are assigned numbers (1, 2, 3, . . . ), and columns of the pixel areas are assigned symbols (a, b, c, . . . ) to enable identifying each pixel area of the matrix 43 with such a notation as (1, a) and (2, c). Specifically, referring to FIG. 4B, as the continuous paper P is being conveyed, ink is discharged from the nozzles of the nozzle arrays assigned record data onto relevant pixel areas in order of the columns a, b, c, . . . , and so on.

The dot data is not limited to binary data indicating whether ink is discharged, and may be multivalued data including information about the dot size.

Figure 5:
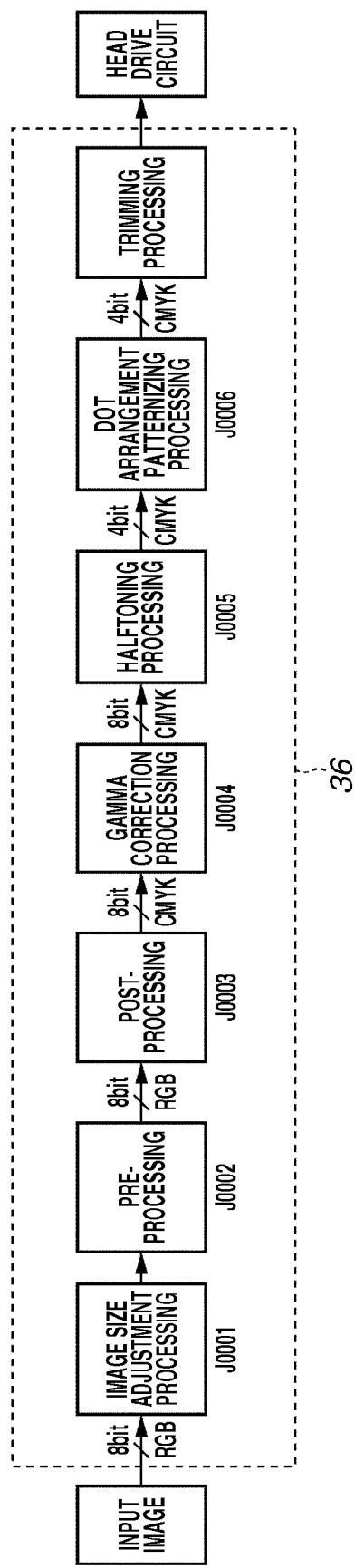
FIG. 5 is a block diagram illustrating detailed processing in an image data processing unit according to the first exemplary embodiment.

FIG. 5 is a block diagram illustrating detailed image information processing in the image data processing unit 36 illustrated in FIG. 3. As illustrated in FIG. 5, the image data processing unit 36 processes image information through the image information processing, which includes image size adjustment processing J0001, pre-processing J0002, post-processing J0003, gamma correction processing J0004, halftoning processing J0005, and dot arrangement patternizing processing J0006.

In the image size adjustment processing J0001, the image data processing unit 36 adjusts the image size when input image information is recorded. Specifically, in the image size adjustment processing J0001, the image data processing unit 36 adjusts the image size to a predetermined magnification with respect to the image size used at the time of image recording included in the image information. The recording apparatus 1 according to the present exemplary embodiment adjusts the size so that the width direction of the continuous paper P is +10 mm longer than the input image size. In the first exemplary embodiment, since the recording head 2 is +10 mm longer than the continuous paper P, the image cannot be recorded onto the continuous paper P even if the image size is enlarged. If a detected side end position of the continuous paper P exceeds the +10-mm range, printing is interrupted for example.

In short, the magnification can be adjusted up to the length recordable by the recording head 2, and suitably determined within a recordable range. For example, the image size is enlarged so that the width of the image becomes larger than the width of the continuous paper P. Even when the continuous paper P skews and shifts from a standard position in the width direction, if the amount of shift is within an assumed range, the image size is enlarged so that the image protrudes from both side ends of the continuous paper P. The range of possible amount of shift of the continuous paper P in the width direction can be assumed by statistically processing information about the amount of shift previously acquired by detecting a side end position of the continuous paper P.

In the pre-processing J0002, the image data processing unit 36 perform color gamut mapping. The image data processing unit 36 performs data format conversion for mapping the color gamut reproduced by R, G, and B image data conforming to the sRGB standard onto the color gamut reproduced by the recording apparatus 1 according to the present exemplary embodiment. Specifically, the image data processing unit 36 converts data with which each of R, G, and B is represented by 8 bits into 8-bit data of different R, G, and B by using a three-dimensional look-up table (LUT). In the post-processing J0003, based on the R, G, and B data having undergone the above-mentioned color gamut mapping, the image data processing unit 36 performs processing for acquiring color separation data Y, M, C, and K corresponding to combinations of ink reproducing the color represented by the R, G, and B data. Similar to the pre-processing J0002, interpolating calculation is used together with the three-dimensional LUT. In the gamma correction processing J0004, the image data processing unit 36 applies gradation value conversion to each color data of the color separation data acquired by the post-processing J0003. Specifically, the image data processing unit 36 performs gradation value conversion in such a way that the above-mentioned color separation data is linearly related to the gradation characteristics of the recording apparatus 1 by using a one-dimensional LUT according to the gradation characteristics of each color ink of the recording apparatus 1. In the halftoning processing J0005, the image data processing unit 36 performs quantization processing for converting each piece of 8-bit color separation data Y, M, C, and K into 4-bit data. In the present exemplary embodiment, the image data processing unit 36 converts 256-gradation 8-bit data into 9-gradation 4-bit data with a resolution of 600 dpi by using the error diffusion method. This 4-bit data serves as an index of arrangement pattern in the dot arrangement patternizing processing J0006 in the recording apparatus 1.

Then, the image data processing unit 36 performs the dot arrangement patternizing processing J0006. In the halftoning processing J0005, the image data processing unit 36 reduces the number of levels from 256-multivalued density information (8-bit data) down to 9-value gradation value information (4-bit data). However, the information that can be actually recorded by the ink jet recording apparatus 1 according to the present exemplary embodiment is binary information indicating whether ink is recorded or not. In the dot arrangement patternizing processing J0006, the image data processing unit 36 reduces the number of levels from 0- to 8-multivalued levels down to the binary level which determines whether a dot exists or not. Specifically, in the dot arrangement patternizing processing J0006, the image data processing unit 36 assigns to each pixel a dot arrangement pattern corresponding to a gradation value (gradation levels 0 to 8) of each pixel represented by 4-bit data (indicating levels 0 to 9) output from the halftoning processing J0005.

Then, the image data processing unit 36 applies the trimming processing to dot data 101 (including nozzle specification information) assigned to each nozzle array based on the dot arrangement pattern. In the trimming processing, the image data processing unit 36 updates a part of the image data from "1" to "0" based on side end position information of the continuous paper P detected immediately before recording. It is useful to detect a side end position of the continuous paper P subjected to the trimming processing at the same timing as recording if possible. Therefore, in the present exemplary embodiment, a side end position of the continuous paper P is detected immediately after completion of the dot arrangement patternizing processing J0006. Alternatively, although a side end position of the continuous paper P may be detected during the dot arrangement patternizing processing J0006, it is useful to detect a side end position immediately before completion of the dot arrangement patternizing processing J0006.

Figure 7:
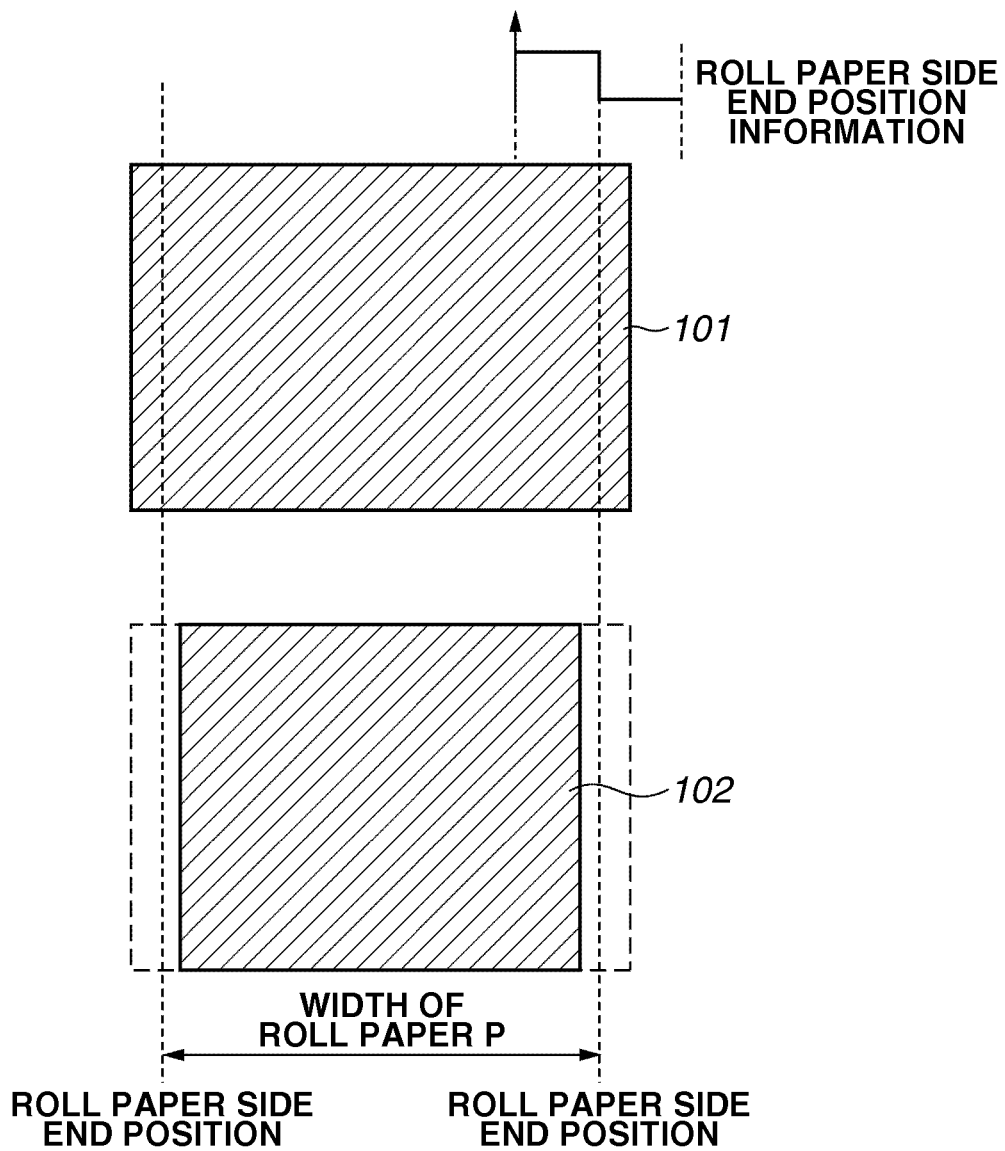
FIG. 7 illustrates a concept of trimming processing.

FIG. 7 illustrates a concept of the trimming processing. Based on information about a detected side end position of the continuous paper P and information about the known continuous paper P subjected to recording, the image data processing unit 36 calculates the other side end position. The image data processing unit 36 determines the amount of trimming to be applied to the dot data 101 based on the two side end positions and a set amount of white margin (for bordered printing) and generates new dot data 102.

Figure 8:
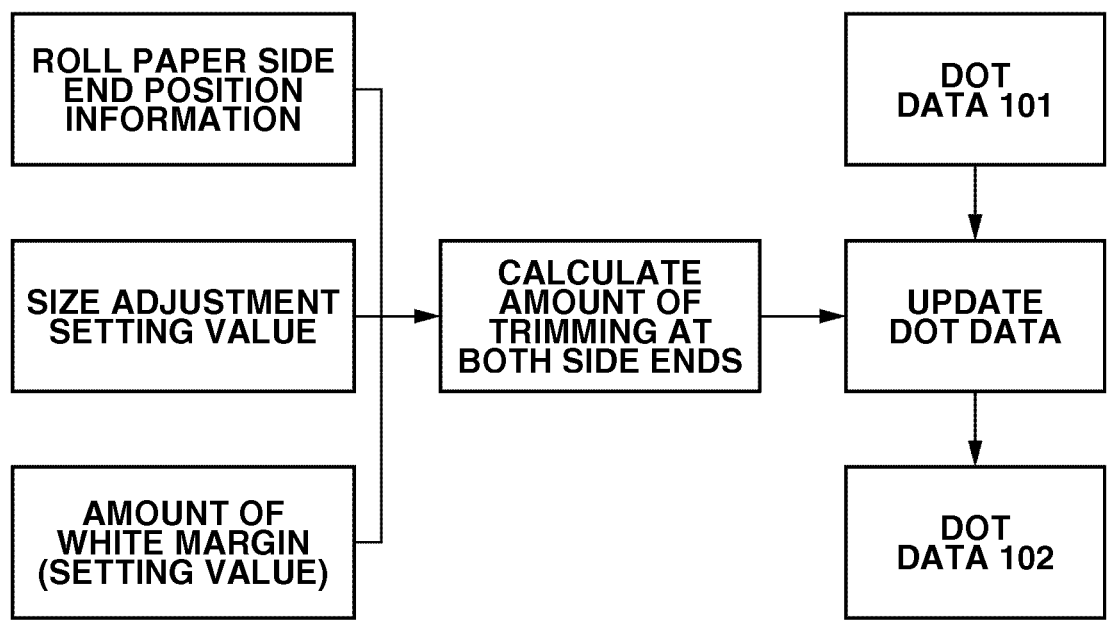
FIG. 8 is a flowchart illustrating the trimming processing.

FIG. 8 illustrates a flowchart illustrating the trimming processing. The amount of trimming at both side ends applied to the dot data 101 in the trimming processing (see FIG. 7) is determined based on information about a detected side end position of the continuous paper P, a set amount of white margin (for bordered printing), and a magnification after image size adjustment.

Example trimming processing is illustrated in FIG. 7. For example, when the continuous paper P has a width Wp (152.4 mm), the width of the dot data 101 of the image is adjusted to a width Wd (162.4 mm), which is 10 mm larger than the width Wp of the continuous paper P (Wd>Wp). The width Wd is equivalent to 7672 pixels with a resolution of 1200 dpi (hereinafter pixels are indicated with this resolution). An amount of white margin Ms is set to 4 mm (189 pixels). When a side end of the continuous paper P comes to the center position of the detection sensor 20, the continuous paper P is assumed to have no shift (origin). Referring to FIG. 7, a positive value is assumed to be a shift of the continuous paper P to the right.

When side ends of the continuous paper P have no shift, the image data processing unit 36 trims a 9-mm width from the right side end of the image and updates the dot data 101 so that ink is not to be discharged onto a 9-mm width (hereinafter referred to as non-discharge width). The 9-mm non-discharge width (425 pixels) is a sum of a half of the size adjustment value +10 mm (Wd−Wp), 5 mm (236 pixels), and the amount of white margin Ms, 4 mm (189 pixels). Therefore, the non-discharge width at the right side end is represented by a formula (Wd−Wp)×½+Ms. Likewise, the image data processing unit 36 updates the dot data 101 so that ink is not to be discharged onto a 9-mm width from the left side end of the dot data 101. The 9-mm non-discharge width (425 pixels) is a sum of the remaining half of the size adjustment value +10 mm, 5 mm (236 pixels), and the amount of white margin Ms, 4 mm (189 pixels). The non-discharge width at the left side end is represented by the same formula as the non-discharge width at the right side end. The image data processing unit 36 processes the image data in this way to generate new dot data 102 for producing a 4-mm white margin on the continuous paper P.

Suppose that the information from the detection unit 21 for detecting a side end position of the continuous paper P indicates that a side end of the continuous paper P shifts from the origin by Ls, i.e., +3 mm (142 pixels). In this case, the image data processing unit 36 updates the dot data 101 so that ink is not to be discharged onto a 6-mm width from the right side end of the dot data 101. The 6-mm non-discharge width (283 pixels) is a sum of a half of the size adjustment value +10 mm, 5 mm (236 pixels), and the amount of white margin Ms, 4 mm (189 pixels), minus +3 mm (142 pixels). Therefore, the non-discharge width at the right side end is represented by a formula (Wd−Wp)×½+Ms−Ls. The image data processing unit 36 updates dot data "1" to "0" so that ink is not to be discharged onto a 12-mm width from the left side end of the dot data 101. The 12-mm non-discharge width (567 pixels) is a sum of a half of the size adjustment value +10 mm, 5 mm (236 pixels), and the amount of white margin Ms, 4 mm (189 pixels), plus +3 mm (142 pixels). Therefore, the non-discharge width at the left side end is represented by a formula (Wd−Wp)×½+Ms+Ls. The image data processing unit 36 processes the image data in this way to generate new dot data 102 for producing a 4-mm white margin on the continuous paper P.

In the above-mentioned example, the image is enlarged with such a magnification that the image protrudes from both side ends of the continuous paper P in the width direction even if the continuous paper P shifts in the width direction within an assumed range. However, the image may be enlarged so that the image protrudes into margins set at both side ends of the continuous paper P even if the continuous paper P shifts in the width direction within the assumed range.

The image data processing unit 36 transfers the dot data 102 to a head drive circuit (see FIG. 5) of the image recording unit 37 (see FIG. 3). The recording head 2 discharges ink from respective nozzle arrays at different discharge timings in relation to the interval between nozzle arrays. Applying the trimming processing to the dot data 101 based on information about a detected side end position of the continuous paper P enables recording the image on a suitable position against continuous paper skew.

In the present exemplary embodiment, the image data processing unit 36 updates the image data to an image enlarged so that the width of the image to be formed on the continuous paper P becomes larger than the width of the continuous paper P. Then, based on positional information of a side end of the continuous paper P, the image data processing unit 36 further updates the image data so that ink is not to be discharged onto both side ends of the continuous paper P to enable providing margins having a predetermined width at both side ends of the continuous paper P.

FIG. 9 is a flowchart illustrating a recording operation of the ink jet recording apparatus 1. In step S1, the CPU 33 acquires image data via the image data input unit 31. In step S2, the CPU 33 enlarges the size of the acquired image data with a predetermined magnification. In step S3, the CPU 33 starts image processing for converting the acquired image data into dot data. In step S4, the CPU 33 determines whether conversion into dot data is completed. When the CPU 33 determines that conversion into dot data is completed (YES in step S4), the processing proceeds to step S5. In step S5, the CPU 33 acquires side end position information of the continuous paper P via the detection unit 21. In step S6, based on the acquired side end position information of the continuous paper P, the CPU 33 partially updates the dot data 101 to form predetermined margins at both side ends of the continuous paper P.

The image data processing unit 36 adjusts the image to a size slightly larger than the size of the continuous paper P in this way, and then applies various correction processing to the image data. Then, based on the side end position information of the continuous paper P acquired from the detection unit 21, the image data processing unit 36 applies the trimming processing (for trimming an image portion) to the image having undergone binarization processing, enabling recording the image at a suitable position on the roll paper.

In the skew correction control used in the first exemplary embodiment, the image data processing unit 36 adjusts the image to an image size which is redundant with respect to the recordable width of the recording head 2 and the amount of skew of the roll paper P. This size adjustment processing may increase the amount of trimming, possibly resulting in an increase in the amount of trimming in the periphery of the input image.

In a second exemplary embodiment of the present invention, the ink jet recording apparatus 1 further includes a memory unit for storing output information from the detection unit 21, and an image shift unit for shifting the recording position of the image data. This configuration enables maintaining a small magnification for image size adjustment (hereinafter referred to as adjustment magnification) to a predetermined magnification with respect to a target image size or eliminating the need of enlarging the image. Specifically, based on prestored skew states (individual differences between recording apparatuses) in the memory unit, coarse correction can be applied to a plurality of image data through the image shift processing, thus maintaining a small adjustment magnification and reducing the amount of trimming. FIGS. 10A and 10B illustrate a concept of the image shift processing.

A size adjustment unit according to the second exemplary embodiment uses together the image shift unit according to the first exemplary embodiment to maintain a small adjustment magnification. The adjustment magnification can be determined by the amount of trimming subjected to fine correction with respect to coarse correction by the image shift processing. Since the adjustment magnification depends on the reproducibility of the constituting recording apparatus, it is desirable to previously acquire a variation in skew state reproduction and determine the adjustment magnification in consideration of the acquired variation in skew state reproduction.

FIG. 10A illustrates skew state information (individual differences between recording apparatuses) for a certain time period prestored in the memory unit. The prestored skew state information includes one-point data for each region subjected to recording of each piece of image data, enabling grasping past skew states of the continuous paper P. FIG. 10A illustrates that the amount of positional shift of the continuous paper P in the width direction changes to Ls1, Ls2, and Ls3 as the continuous paper P is conveyed. For example, if there is a tendency that a positional shift of the continuous paper P periodically occurs on both sides similar to a sine curve, the skew state information enables predicting which position a side end position of the continuous paper P will be located at and at which timing, when the roll paper P is conveyed next time. The skew state information may be prestored in the memory unit when a side end of the roll paper P is detected by test conveyance, when a side end of the roll paper P is detected during actual printing in the past, and when data is input at the time of shipment. Further, the skew state information may be prestored at any combination of these timings, and suitably updated when necessary by a relevant mechanism. In the case of a periodical variation in the amount of positional shift that can be calculated by a formula, for example, the amount of positional shift may be acquired through calculation as predicted positional information for a relevant recording medium. Alternatively, the amount of positional shift may be stored in a table and be read from the table for use as predicted positional information for the recording medium.

On the other hand, a variation in the actual amount of positional shift is subjected to fine correction by the trimming processing. Therefore, it is desirable to incorporate a variation in skew state reproduction when the roll paper P skews up to the recordable region of the recording head 2 into the adjustment magnification of the size adjustment unit. For example, when the variation in skew state reproduction in FIG. 10A is ±1 mm, it is necessary to perform image size adjustment so that the width of the roll paper P is at least +2 mm larger than the input image size. Although a fixed adjustment magnification for a plurality of images has specifically been described, the adjustment magnification is not limited thereto, and may be variable for each image depending on the presumption of a variation in skew state reproduction. For example, if the variation in skew state reproduction increases with an increasing skew amount prediction value as illustrated in FIG. 10A, the adjustment magnification can be differentiated for each image. Alternatively, image size adjustment may be omitted.

Figure 11:
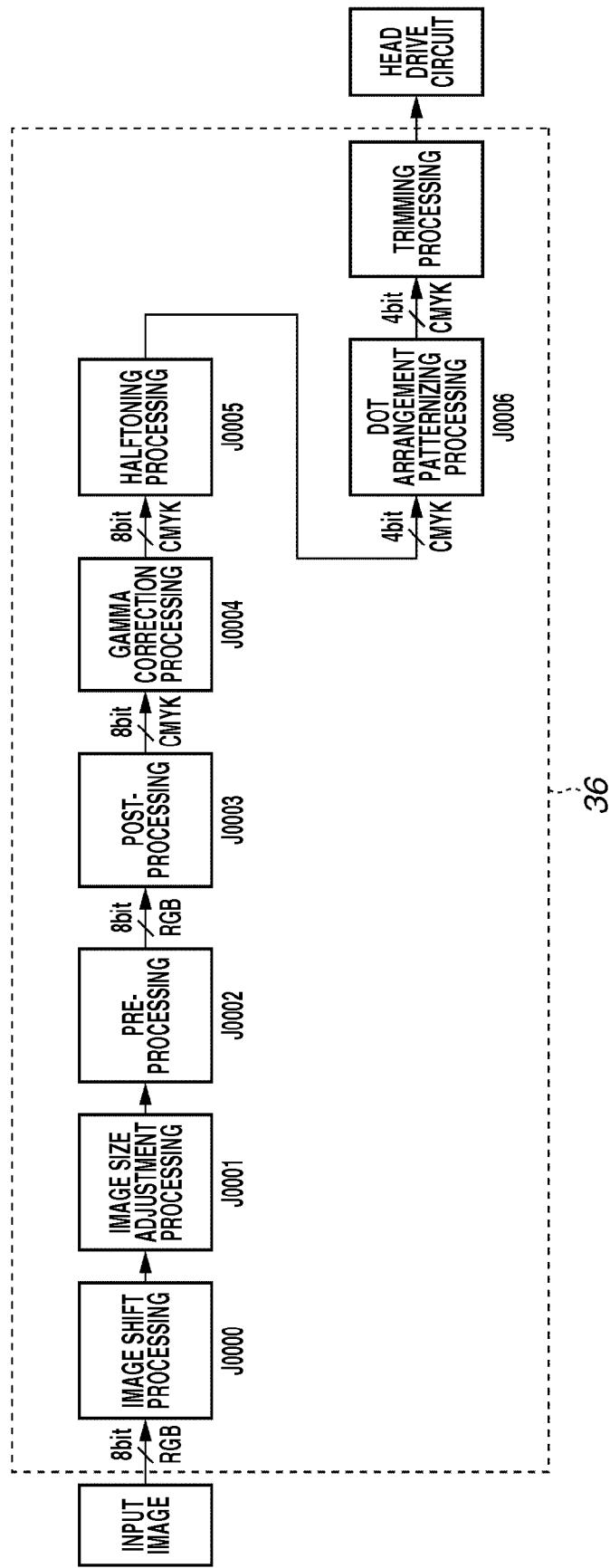
FIG. 11 is a block diagram illustrating detailed processing in an image data processing unit according to a second exemplary embodiment of the present invention.

Then, the image data processing unit 36 applies the image shift processing (for shifting the image recording position in the width direction (see FIG. 10B)) to the image data having undergone size adjustment in this way based on the predicted positional information of the continuous paper P at the time of image formation (during ink discharge from the recording head 2). Referring to FIG. 10B, when the position of the continuous paper P is expected to shift to Ls1, Ls2, and Ls3, the processing for shifting the image recording position to Ls1, Ls2, and Ls3 has been performed. Although the image shift processing J0000 illustrated in FIG. 11 is performed before the image size adjustment processing J0001, the image shift processing J0000 may be performed after the image size adjustment processing J0001. The image data having undergone the image shift processing in this way is subjected to the subsequent processing up to the dot arrangement patternizing processing J0006 in the image data processing unit 36 described in the first exemplary embodiment. Upon completion of the dot arrangement patternizing processing J0006, the CPU 33 acquires actual side end position information of the continuous paper P from the detection unit 21. Finally, based on the acquired actual side end position information, the image data processing unit 36 performs fine correction through the trimming processing for updating the data for the side end region of the image from "1" to "0" to obtain a suitable image recording position.

Figure 12:
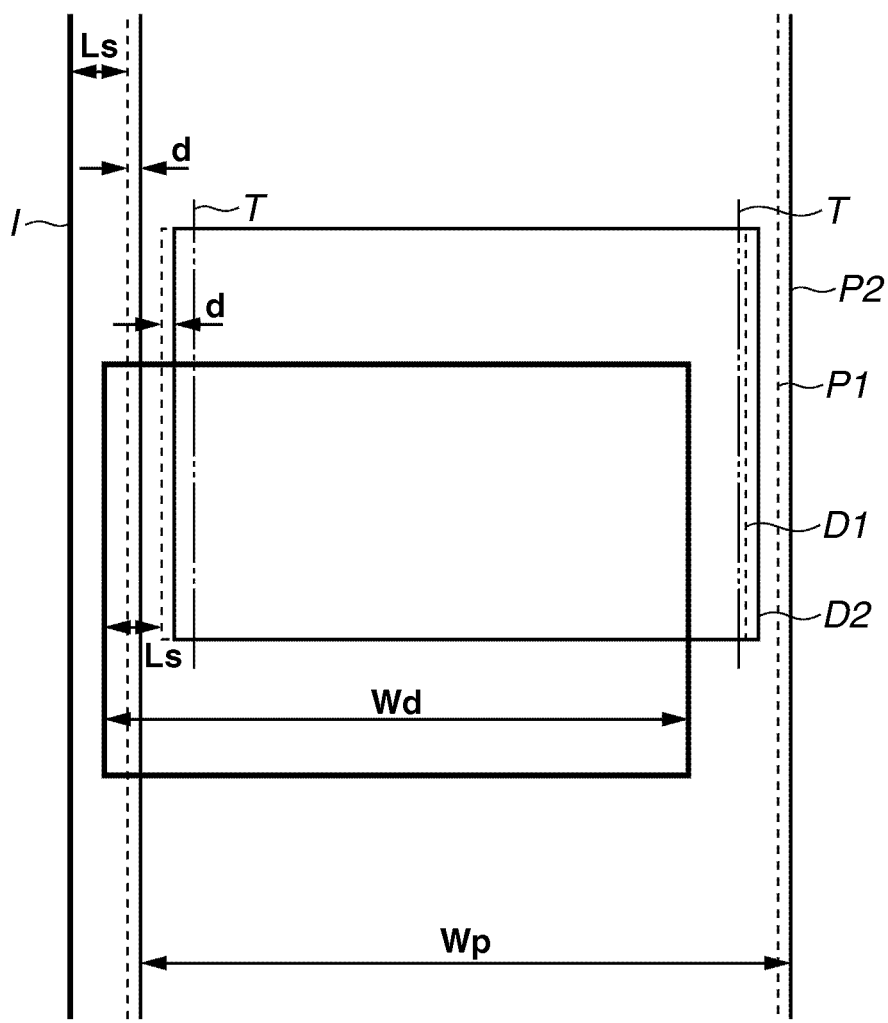
FIG. 12 illustrates a deviation of side ends of continuous paper, an image shift, and trimming.

For example, as illustrated in FIG. 12, the continuous paper P has a width Wp and the image has a width Wd. Suppose that the CPU 33 predicts that a side end of the continuous paper P will shift from a standard position I (an ideal position without shift) by Ls (positive for a shift to the right), and shifts as coarse adjustment the image by Ls in the width direction to change the image position to a position D1. Suppose that the detection unit 21 detects an actual positional shift Ls and a position P1 of the continuous paper P, an image is formed at an ideal position where the center of the image coincides with the center of the continuous paper P. In this case, the CPU 33 updates the dot data 101 so that an image is not to be formed on a width calculated by a formula $(Wd-Wp)\times\frac{1}{2}+Ms$ at both side ends of the image. Although $(Wd-Wp)$ may be a positive or negative value, the CPU 33 sets values of Wd, Wp, and Ms so that the formula $(Wd-Wp)\times\frac{1}{2}+Ms$ gives a positive value. Suppose that the detection unit 21 detects an actual positional shift Ls+d and a position P2 of the continuous paper P, where d indicates a variation with respect to the predicted value. In this case, the CPU 33 further shifts the image by d as fine adjustment to change the image position to a position D2. The CPU 33 also adjusts the trimming width by d and erases the image on the outer side of a two-point chain line T from the image at the position D2. The CPU 33 updates dot data 101 so that an image is not to be formed in a width calculated by a formula $(Wd-Wp)\times\frac{1}{2}+Ms-d$ at the right side end of the image. The CPU 33 updates dot data 101 so that an image is not to be formed on a width calculated by a formula $(Wd-Wp)\times\frac{1}{2}+Ms+d$ at the left side end of the image.

The dot data 101 updated by the above processing is transferred to the head drive circuit (see FIG. 5) of the image recording unit 37 (see FIG. 3). The CPU 33 discharges ink from each nozzle array of the recording head 2 at different discharge timings in relation to the interval between the nozzle arrays. Performing the image shift processing and trimming processing based on information about a detected side end position of the roll paper P in this way enables recording the image at a suitable position against roll paper skew.

Figure 13:
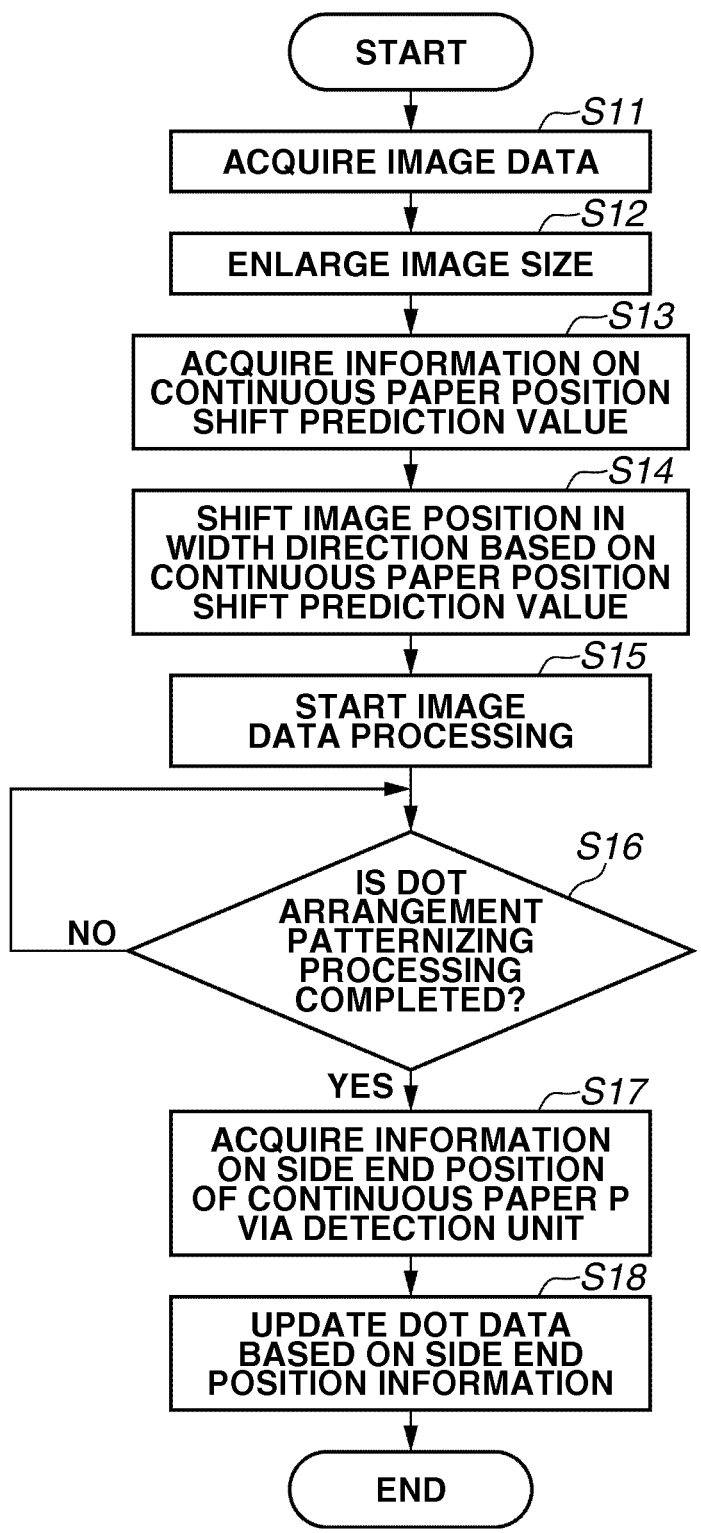
FIG. 13 is a flowchart illustrating a recording operation of an ink jet recording apparatus according to the second exemplary embodiment.

FIG. 13 is a flowchart illustrating a recording operation of the ink jet recording apparatus 1 according to the second exemplary embodiment. In step S11, the CPU 33 acquires image data via the image data input unit 31. In step S12, the CPU 33 enlarges the size of the acquired image data with a predetermined magnification. Step S12 may be skipped. In step S13, the CPU 33 acquires predicted positional information of the continuous paper P by using a table or formula. The predicted positional information may be predicted positional information when image formation by the recording head 2 is started (when ink discharge for image formation is started), or predicted positional information when a half of image formation is completed. In either case, the CPU 33 acquires predicted positional information of the continuous paper P during image formation by the recording head 2 by actually discharging ink. In step S14, the CPU 33 performs coarse adjustment by shifting the position of the image in the width direction based on the acquired predicted positional information. In step S15, the CPU 33 starts image processing for converting the image data into dot data. In step S16, the CPU 33 determines whether conversion into dot data is completed. When the CPU 33 determines that conversion into dot data is completed (YES in step S16), the processing proceeds to step S17. In step S17, the CPU 33 acquires side end position information of the continuous paper P via the detection unit 21. In step S18, based on the acquired side end position information of the continuous paper P, the CPU 33 partially updates the dot data 101 to form predetermined margins at both side ends of the continuous paper P.

In the above-mentioned exemplary embodiments, continuous paper skew information is prestored in memory, and the recording apparatus 1 is provided with a position prediction program (acquisition unit) for predicting the position of the continuous paper P based on the continuous paper skew information. The CPU 33 updates the image data so that the position of the image shifts in the skew direction according to the predicted position of the continuous paper P. It is also possible, before conversion of the image into dot data, to acquire the side end position information of the continuous paper P via the detection unit 21, and, based on the acquired side end position information, shift the image position. In this case, in step S13 of the flowchart in FIG. 13, the CPU 33 acquires the side end position information of the continuous paper P via the detection unit 21 instead of the predicted positional information of continuous paper P.

In each of the above-mentioned exemplary embodiments, the recording apparatus 1 records an image at a suitable position. A threshold value for coping with the amount of skew can be acquired based on the width of the roll paper P, the width recordable by the recording head 2, the adjustment magnification, and the length of the sensor for detecting a side end position of the roll paper P. For example, in the first exemplary embodiment, since an image adjustment value is +10 mm, the recording apparatus 1 can cope with a shift of up to ±5 mm from a standard side end position of the roll paper P. Therefore, the recording apparatus 1 needs to be provided with a function of stopping recording because, when the threshold value is set to ±5 mm, correction becomes difficult if a side end position of the roll paper P changes more than the threshold value. Although descriptions have been made according to the first exemplary embodiment, the threshold value can be suitably determined depending on the configuration of the recording apparatus 1.

Although, in the above-mentioned second exemplary embodiment, the detection unit 21 detects a side end position at intervals of each piece of image data, the detection interval is not limited thereto, and may be increased or decreased. Further, the detected data may be interpolated. The trimming processing may be performed not for each piece of image data but in each image according to the detection interval.

Figure 14:
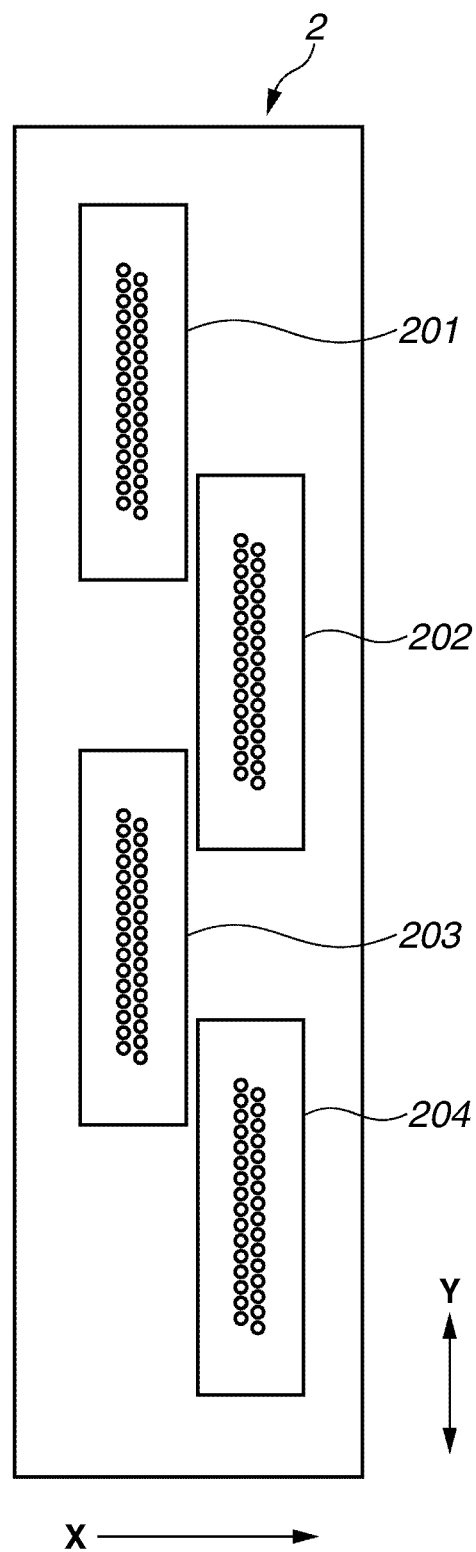
FIG. 14 illustrates a nozzle configuration of a recording head according to another exemplary embodiment of the present invention.

Although, in the above-mentioned exemplary embodiments, a plurality of nozzle arrays is arranged in the recording head 2 as illustrated in FIG. 4A, the nozzle configuration is not limited thereto. For example, as illustrated in FIG. 14, the recording head 2 may be provided with a plurality of nozzle chips each having a plurality of nozzle arrays. Referring to FIG. 14, the recording head 2 is provided with a plurality of nozzle chips 201, 202, 203, 204, and 205 each having a plurality of nozzle arrays. Adjacent nozzle chips are arranged so as to shift in the recording medium conveyance direction. Nozzles at end regions of adjacent nozzle chips overlap in the recording medium conveyance direction. With the thus-configured recording head 2, the closer to a side end of a nozzle chip in a nozzle overlapping region, the less number of nozzles used. Thus, variation in image quality caused by using different nozzle chips is minimized. Since such processing is time-consuming, it is difficult to perform the image shift processing after detecting a side end position of the continuous paper P at the start of recording or immediately before the start of recording. In the above-described exemplary embodiments, the recording apparatus 1 completes image processing up to the dot arrangement patternizing processing before detecting a side end position of the continuous paper P, and, after detecting a side end position, performs the processing for partially updating the dot data 101 from "1" to "0". Thus, the recording apparatus 1 detects a side end position of the continuous paper P immediately before the start of recording, and can form an image at a suitable position on the continuous paper P based on information about the detected side end position.

Further, nozzle arrays covering the entire width may be formed as one chip. Alternatively, one nozzle array is formed in each recording head, and a plurality of recording heads is provided for each color.

Although, in the above-described exemplary embodiments, the recording apparatus 1 is used on a standalone basis, a recording system including a personal computer and a recording apparatus may be configured, where, for example, the personal computer performs image processing up to the dot arrangement patternizing processing (see FIG. 5) and transfers to the recording apparatus final acquired dot data 101 for recording.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-044071 filed Mar. 1, 2011, which is hereby incorporated by reference herein in its entirety.

What is claimed is:

1. An image forming apparatus comprising:
    a conveyance unit configured to convey a recording medium in a predetermined direction;
    a processing unit configured to generate dot data for forming an image to be printed on the recording medium based on acquired image data; and
    a detection unit configured to detect a side end position of the recording medium conveyed by the conveyance unit,
    wherein the processing unit is configured to enlarge the image to be printed on the recording medium such that a portion of the enlarged image protruding into a predetermined margin region at a side end of the recording medium, convert the image data of the enlarged image into dot data, and, process the dot data to trim dot about the portion of the enlarged image protruding into the set margin region so that the portion of the enlarged image protruding into the predetermined margin region is not to be printed on the recording medium, and
    wherein the processing unit is configured to determine a trimming portion for processing the dot data to trim dot based on the side end position of the recording medium being conveyed by the conveyance unit, detected by the detection unit, and the length of the predetermined margin region in a crossing direction cross to the predetermined direction.

2. The image forming apparatus according to claim 1, wherein, before converting the image data into dot data, the processing unit enlarges the image of the acquired image data to a size protruding over outside of the side end of the recording medium.

3. The image forming apparatus according to claim 1, wherein, after the processing unit converts the image data into dot data, the detection unit detects a side end position of the recording medium.

4. The image forming apparatus according to claim 1, wherein, immediately before the processing unit completes processing for converting the image data into dot data, the detection unit detects a side end position of the recording medium.

5. The image forming apparatus according to claim 1, further comprising an image forming unit for printing the enlarged image on the printing medium, wherein the image forming unit includes a full-line type ink jet recording head.

6. The image forming apparatus according to claim 1, further comprising an image forming unit for printing the enlarged image on the printing medium, wherein, when a side end position of the recording medium detected by the detection unit shifts from a standard position more than a predetermined threshold value, the image forming unit stops image printing.

7. The image forming apparatus according to claim 1, wherein the recording medium includes continuous paper.

8. An image forming method comprising:
   enlarging an image of input image data to an enlarged image including a portion protruding into a set margin region formed at a side end of a recording medium;
   converting the image data of which the image has been enlarged into dot data;
   detecting the side end position of the recording medium being conveyed in a predetermined direction after completion of the conversion into the dot data;
   possessing, based on the detected side end position of the recording medium and the length of the set margin region in a cross direction cross to the predetermined direction, the dot data to trim dot thereof about the portion of the enlarged image protruding into the set margin region so as to prevent the portion of the enlarged image protruding into the set margin region from being formed on the recording medium; and
   forming an image on the recording medium based on the processed dot data.

9. The image forming method according to claim 8, further comprising processing the dot data to trim dot thereof about the portion of the enlarged image protruding over the set margin region.

10. An image forming apparatus comprising:
    a conveyance unit configured to convey a recording medium;
    a processing unit configured to generate dot data for forming an image based on obtained image data;
    an image forming unit configured to form an image on the recording medium conveyed by the conveyance unit based on the dot data generated by the processing unit;
    a detection unit configured to detect a side end of the recording medium conveyed by the conveyance unit; and
    an acquisition unit configured to acquire predicted positional information of the recording medium,
    wherein the processing unit changes a position of an image of the obtained image based on the predicted positional information acquired by the acquisition unit, then converts the image data on which the size of image has been enlarged into dot data, and based on a result of detection by the detection unit, processes the dot data so that image data is not performed on a portion of the image protruding over a set margin region to be formed at the side end of the recording medium.

11. The image forming apparatus according to claim 10, wherein, before converting the image data into dot data, the processing unit enlarges the image of the acquired image data to a size protruding over the margin region formed at the side end of the recording medium.

12. The image forming apparatus according to claim 10, wherein, before converting the image data into dot data, the processing unit enlarges the image of the acquired image data to a size include the portion protruding over outside of the side end of the recording medium.

13. The image forming apparatus according to claim 10, wherein, after the processing unit converts the image data into dot data, the detection unit acquires side end position information of the recording medium.

14. The image forming apparatus according to claim 10, wherein, immediately before the processing unit completes processing for converting the image data into dot data, the detection unit acquires side end position information of the recording medium.

15. The image forming apparatus according to claim 10, wherein the acquisition unit acquires the predicted positional information of the recording medium when the image forming unit is recording an image on the recording medium.

16. The image forming apparatus according to claim 10, wherein the acquisition unit acquires the predicted positional information of the recording medium when the image forming unit starts recording an image on the recording medium.

17. The image forming apparatus according to claim 10, wherein the processing unit is configured to process the dot data to trim dot thereof about the portion of the enlarged image protruding over the set margin region.

18. An image forming apparatus comprising:
    a conveyance unit configured to convey a recording medium;
    a processing unit configured to generate dot data for forming an image based on obtained image data;
    an image forming unit configured to form an image on the recording medium conveyed by the conveyance unit based on the dot data generated by the processing unit; and
    a detection unit configured to detect a side end of the recording medium conveyed by the conveyance unit,
    wherein the processing unit changes a position of the image of the image data based on a result of detection by the detection unit, converts the image data into dot data, and processes the dot data so that image formation is not performed on a portion of the image protruding over a set margin region at the side end of the recording medium based on a result of another detection by the detection unit after starting conversion of the image information.

19. The image forming apparatus according to claim 18, wherein, before converting the image data into dot data, the processing unit enlarges the image of the acquired image data to a size protruding over the margin region formed at the side end of the recording medium.

20. The image forming apparatus according to claim 18, wherein, before converting the image data into dot data, the processing unit enlarges the image of the acquired image data to a size protruding over the side end of the recording medium.

21. The image forming apparatus according to claim 18, wherein, after the processing unit converts the image data into dot data, the detection unit acquires side end position information of the recording medium.

22. The image forming apparatus according to claim 16, wherein the processing unit is configured to process the dot data to trim dot thereof about the portion of enlarged image protruding over the set margin region.

\* \* \* \* \*